United States Patent [19]

Matsubayashi et al.

[11] Patent Number: 4,631,712

[45] Date of Patent: Dec. 23, 1986

[54] OPTICAL DISK APPARATUS WITH BEAM ENERGY CORRECTION FOR DEVIATIONS IN INCLINATION

[75] Inventors: Nobuhide Matsubayashi; Hideyuki Kenjyo; Kiichi Kato; Masaharu Sakamoto, all of Tokyo, Japan

[73] Assignee: Olympus Optical Co., Ltd., Tokyo, Japan

[21] Appl. No.: 627,764

[22] Filed: Jul. 5, 1984

[30] Foreign Application Priority Data

Jul. 14, 1983 [JP] Japan ................................. 58-128433

[51] Int. Cl.⁴ ............................................. G11B 7/125
[52] U.S. Cl. ...................................... 369/44; 369/116
[58] Field of Search ...................... 369/44, 45, 46, 106, 369/116, 109, 111, 124; 346/76 L, 135.1

[56] References Cited

U.S. PATENT DOCUMENTS

| 4,051,329 | 9/1977 | Blondet et al. ...................... 369/116 |
| 4,093,961 | 6/1978 | Kanamaru ........................... 369/116 |
| 4,135,206 | 1/1979 | Kleuters et al. ...................... 369/45 |
| 4,162,398 | 7/1979 | Kayanuma ........................... 369/116 |
| 4,321,700 | 3/1982 | Russell ................................. 369/44 |
| 4,502,134 | 2/1985 | Kondo et al. ......................... 369/46 |

*Primary Examiner*—Donald McElheny, Jr.
*Attorney, Agent, or Firm*—Frishauf, Holtz, Goodman & Woodward

[57] ABSTRACT

An optical disk apparatus has an optical head. The optical head emits a light beam onto an optical disk and forms pits in the optical disk, thereby recording a signal. A detector detects the relative inclination between the optical head and the optical disk and generates a signal corresponding to this relative inclination. A beam intensity correction circuit corrects the intensity of the light beam in accordance with the relative inclination to form proper pits. In one embodiment, the intensity of the light beam is increased when the relative inclination is increased.

13 Claims, 30 Drawing Figures

OPTICAL DISK APPARATUS WITH BEAM ENERGY CORRECTION FOR DEVIATIONS IN INCLINATION

BACKGROUND OF THE INVENTION

The present invention relates to an improvement of an optical disk apparatus.

Figure 1:
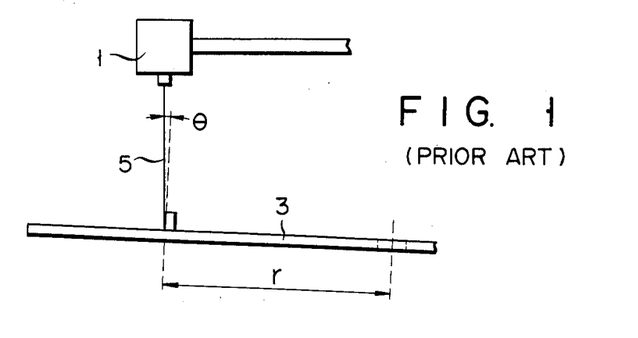
FIG. 1 is a schematic diagram for explaining recording of information in an optical disk in a conventional optical disk apparatus.
Figure 2:
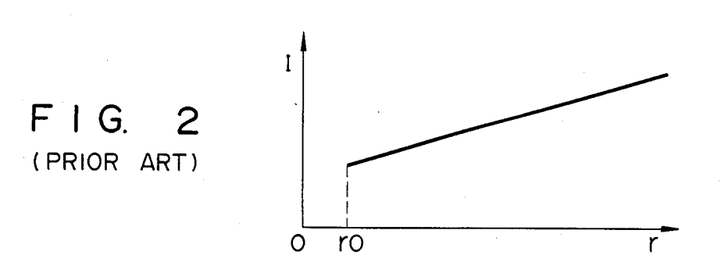
FIG. 2 is a graph for explaining the relationship between the distance from the center of the optical disk and the intensity of the light beam.
Figure 3A:
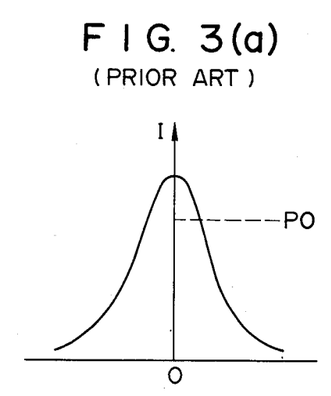
FIGS. 3(a) and 3(b) are respectively graphs for explaining the intensity distributions of beam spots formed on the optical disk.
Figure 3B:
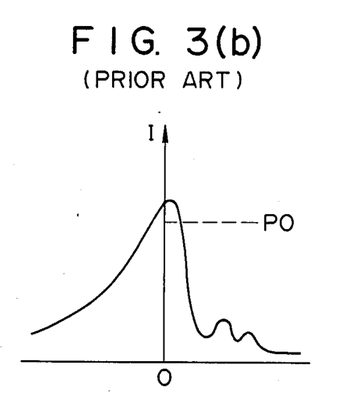
Figure 4:
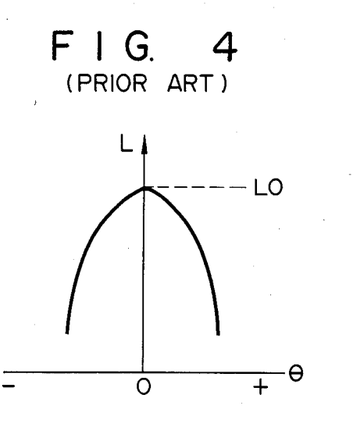
FIG. 4 is a graph for explaining the relationship between the relative inclination between the recording medium and the optical head and the pit length.
Figure 5:
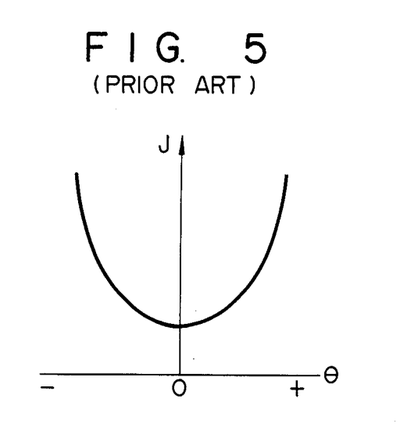
FIG. 5 is a graph for explaining the relationship between the relative inclination and jitter.

A conventional optical disk apparatus shown in FIG. 1 is known wherein a light beam, for example, LASER 5 from an optical head 1 irradiates an optical disk 3 to form pits therein, thereby recording signals. In order to record signals in the optical disk 3 rotating at a constant angular velocity by using the above-mentioned conventional optical disk apparatus, the light beam 5, having a predetermined intensity in accordance with a distance r from the center of the optical disk 3, irradiates the optical disk 3 as shown in FIG. 2. In FIG. 2 reference symbol rO denotes the innermost pregroove. When the optical head 1 is inclined by an angle $\theta$ (corresponding to the incidence angle of the light beam 5 on the optical disk 3) relative to the direction normal to the optical disk 3 during radiation of the light beam 5 onto the optical disk 3, the spot of the light beam 5 to be formed on the optical disk 3 is disturbed (i.e., proper focusing cannot be performed) due to a coma. The relative inclination $\theta$ between the optical head 1 and the optical disk 3 may be caused by an inclination, warp or vibration of the optical disk 3. When the relative inclination $\theta$ is zero, the intensity distribution of the spot of the light beam 5 on the optical disk 3 is given by a curve in FIG. 3(a). However, when the relative inclination $\theta$ is present, the intensity at the center of the spot of the light beam 5 is decreased, as indicated by a curve in FIG. 3(b). In addition of this disadvantage, the right-hand intensity distribution becomes asymmetrical with the left-hand one, and becomes broad. As a result, when the relative inclination $\theta$ is present, length L of pits formed in the optical disk 3 becomes shorter than a proper length LO as shown in FIG. 4. Furthermore, when the relative inclination $\theta$ increases, the intensity of the spot of the light beam 5 on the optical disk 3 becomes smaller than an intensity PO (threshold power PO). The threshold power PO indicates a minimum power of the light beam 5 when a signal is recorded in the optical disk 3 (i.e., when a pit is formed). When the relative inclination $\theta$ is large, the signal cannot be recorded in the optical disk 3 (i.e., pits cannot be formed). In addition, as described above, when the relative inclination $\theta$ is present, the intensity distribution of the spot of the light beam 5 on the optical disk 3 becomes broad, as shown in FIG. 3(b). For this reason, as shown in FIG. 5, the jitter J of the signal to be recorded increases. In the conventional optical disk apparatus, when a signal recorded with the relative inclination $\theta$ is reproduced, the error rate of the reproduced signal is increased, resulting in inconvenience.

SUMMARY OF THE INVENTION

Consequently, it is an object of the present invention to provide an optical disk apparatus capable of properly recording/reproducing a signal even if a relative inclination is present between an optical disk and an optical head.

In order to achieve the above object of the present invention, there is provided an optical disk apparatus comprising:

an optical head for radiating a light beam onto a recording medium and for forming pits in said recording medium to record a signal;

detecting means for detecting a relative inclination between said optical head and said recording medium and for generating a signal corresponding to an angle of the relative inclination; and correcting means for correcting the light beam generated from said optical head so as to form predetermined pits in accordance with the signal from said detecting means.

According to the optical disk apparatus having the above arrangement, the light beam is corrected to record information in the recording medium when a relative inclination is present between the recording medium and the optical head. For this reason, even if a relative inclination is present, proper pits are formed. In other words, the information can be accurately recorded in the recording medium. Therefore, jitter of the signal will not increase even if a relative inclination is present, thereby decreasing the error rate of the signal upon its reproduction.

DETAILED DESCRIPTION OF THE PREFERRED EMBODIMENT

An optical disk apparatus according to an embodiment of the present invention will be described with reference to the accompanying drawings.

Figure 6:
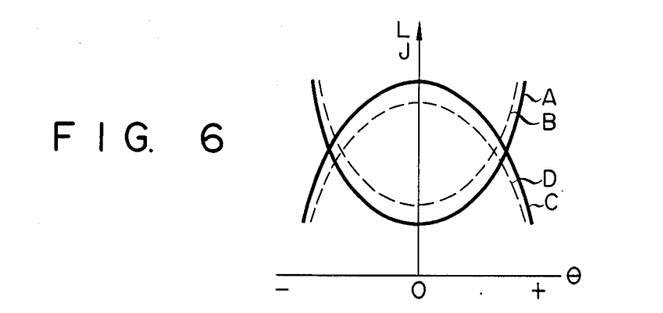
FIG. 6 is a graph for explaining the relationship between the relative inclination, the intensity of the light beam, the pit length and jitter.

As previously described, when the relative inclination $\theta$ between an optical disk 3 and an optical head 1 is present, the jitter of the signal increases. On the other hand, when the intensity of the light beam 5 is increased, the pit length L increases, but the jitter decreases. This relationship is illustrated in FIG. 6. Referring to FIG. 6, curve A indicates the jitter J when the intensity of the light beam 5 is high; curve B indicates the jitter J when the intensity of the light beam 5 is low; curve C indicates the pit length L when the intensity of the light beam 5 is high; and curve D indicates the pit length L when the intensity of the light beam 5 is low. The relative inclination $\theta$ is plotted along the abscissa. As shown in FIG. 6, assume that the relative inclination $\theta$ is present. When the intensity of the light beam 5 is corrected in accordance with the relative inclination $\theta$, pits having the proper pit length L can be formed, thereby decreasing the jitter of the signal.

Figures 7A, 7B, 7C:
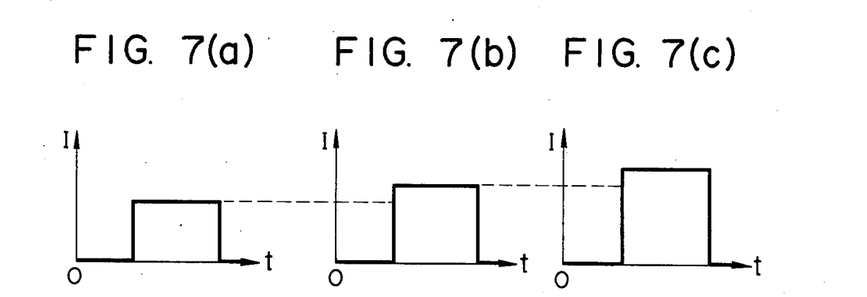
FIGS. 7(a) to 7(c) are respectively graphs for explaining the relationship between the relative inclination and the intensity of the light beam.

The relationship between the corrected intensity of the light beam 5 and the light beam emission time is illustrated in FIGS. 7(a) to 7(c). FIG. 7(a) shows the case when the relative inclination $\theta$ is zero; FIG. 7(b) shows the case when the relative inclination $\theta$ is small; and FIG. 7(c) shows the case when the relative inclination $\theta$ is large.

Figure 8:
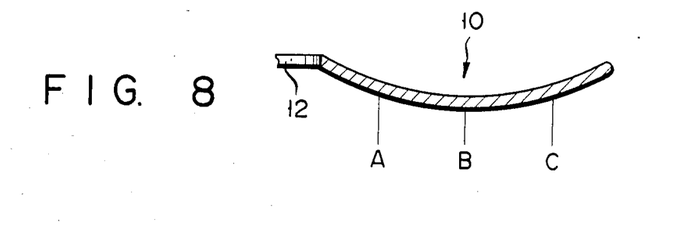
FIG. 8 is a partial sectional view showing a warped portion of the optical disk.
Figure 9A:
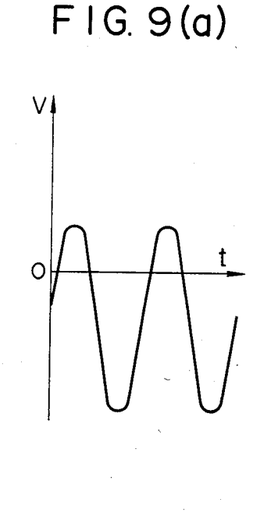
FIGS. 9(a) to 9(c) are timing charts of track error signals, respectively.
Figure 9B:
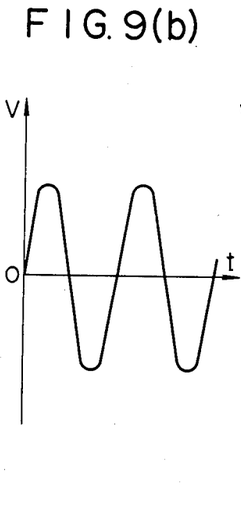
Figure 9C:
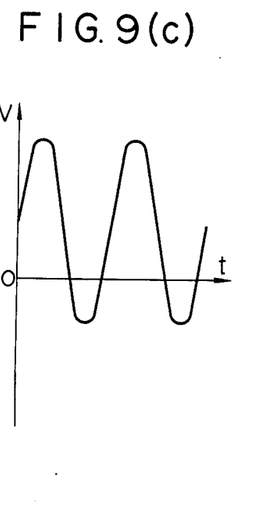

FIG. 8 is a partial sectional view showing a warped portion of an optical disk 10 having a central hole 12. Track error signals (tracking error signals) ET generated by the optical head 1 are shown in FIGS. 9(a), 9(b) and 9(c) when the beam spot crosses at points A, B and C of the optical disk 10 in FIG. 8. Since the relative inclination $\theta$ of the optical disk 10 at point B is substantially zero, the track error signal ET fluctuates having the zero level as the center. However, at point A or C, a relative inclination $\theta$ is present due to warping of the optical disk 10. For this reason, the incident and reflected angles of the light beam 5 on and from the optical disk 10 deviate from each other. Thus, the envelope of the track error signal changes, as shown in FIGS. 9(b) and 9(c). When the envelope of the track error signal is measured by using an optical disk having a predetermined relative inclination, the relative inclination $\theta$ can be detected in accordance with the known envelope and the envelope of the track error signal ET of the optical disk 10. When the angle of the relative inclination $\theta$ is calculated in accordance with the track error signal ET, and the light beam 5 is corrected, proper pits can be formed.

Figure 10:
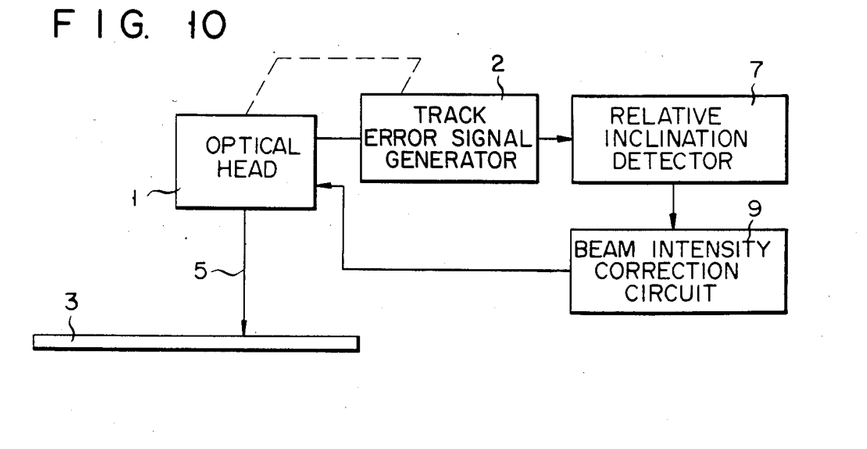
FIG. 10 is a block diagram of an optical disk apparatus according to an embodiment of the present invention.

FIG. 10 is a block diagram of an optical disk apparatus according to an embodiment of the present invention. Referring to FIG. 10, the optical head 1 applies a light beam 5 to the optical disk 10. It also receives the light reflected from the disk 10, and outputs a signal corresponding to the light. The signal is supplied to a track error signal generator 2. The generator 2 generates a track error signal from the input signal. The track error signal is supplied to a relative inclination detector 7. Detector 7 generates a signal corresonding to the relative inclination in accordance with the track error signal. A beam intensity correction circuit 9 generates a signal for correcting the light beam 5 so as to form proper pits in accordance with the signal corresponding to the relative inclination $\theta$ from the detector 7. The optical head 1 then generates a light beam 5 in accordance with the output signal from the beam intensity correction circuit 9.

Figure 11:
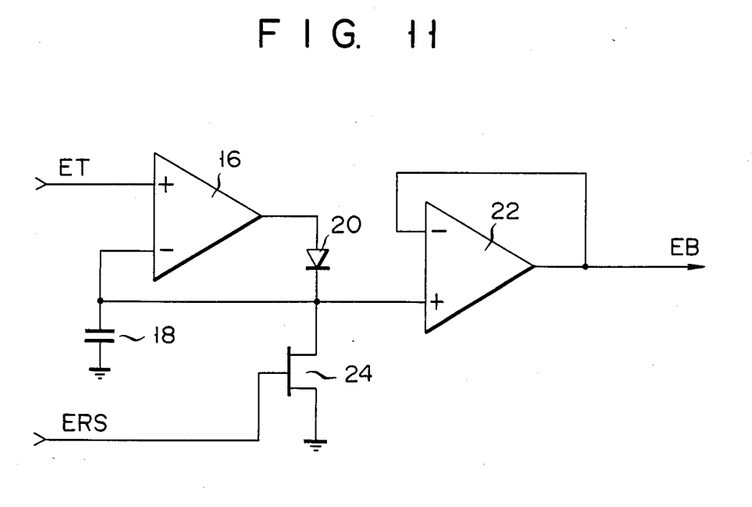
FIG. 11 is a circuit diagram showing an envelope signal generator for generating an envelope signal in accordance with the track error signal.
Figure 12:
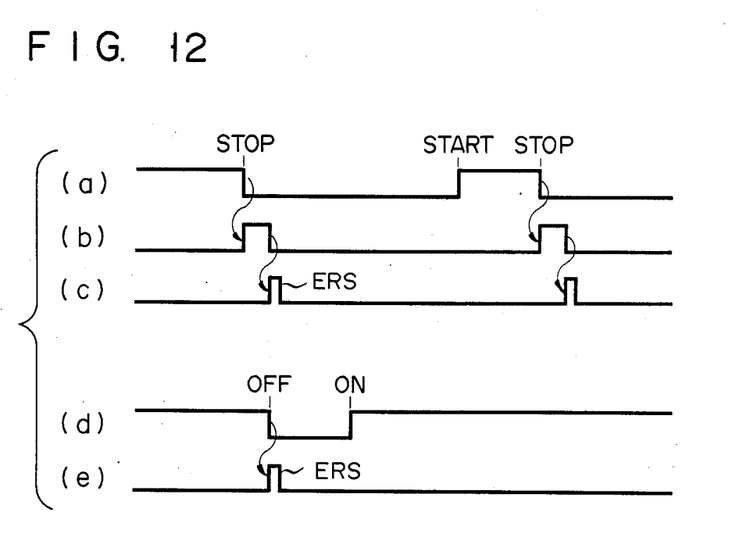
FIGS. 12(a) to 12(e) are respectively timing charts for explaining the generation timings of a reset signal ERS.

FIG. 11 shows the detailed arrangement of the relative inclination detector 7. Referring to FIG. 11, the output terminal of a comparator 16 is connected to the anode of a diode 20. The cathode of the diode 20 is connected to the inverted input terminal of the comparator 16. The inverted input terminal of the comparator 16 is grounded through a capacitor 18. One end of a current path of an FET 24 is connected to the cathode of the diode 20. The other end of the current path is grounded. The cathode of the diode 20 is also connected to a noninverted input terminal of an operational amplifier 22. The output terminal of the amplifier 22 is connected to the inverted input terminal thereof. The track error signal ET is supplied to the noninverted input terminal of the comparator 16. The comparator 16 compares the voltage applied from the charged capacitor 18 with the voltage of the track error signal ET. When the voltage of the track error signal ET is higher than the voltage at the capacitor 18, the comparator 16 generates a positive voltage. The comparator 16 charges the capacitor 18 until the charge potential (voltage at the inverting input terminal of the comparator 16) becomes the same as the maximum peak value of the track error signal ET. The charge potential (i.e., the maximum peak value of the track error signal ET) at the capacitor 18 is applied to the noninverted input terminal of the amplifier 22. The charge potential applied from the capacitor 18 to the noninverted input terminal of the amplifier 22 is generated as an envelope signal EB. In this way, the maximum value of the track error signal ET is generated as the envelope signal EB. In order to obtain an updated envelope signal EB which changes as a function of time, the capacitor 18 is discharged at a proper time interval. In other words, a reset signal ERS is applied to the gate of the FET 24 to turn it on. In this manner, the updated envelope signal EB is obtained. The timings of the reset signal ERS applied to the gate of the FET 24 are illustrated in FIGS. 12(a) to 12(e). FIG. 12(a) shows the operation timing of a voice coil motor (not shown) for driving the optical head 1. As shown in FIG. 12(b), in synchronism with the stop timing of the voice coil motor, a one-shot pulse having a proper pulse width is generated. As shown in FIG. 12(c), in synchronism with the trailing edge of the one-shot pulse, the reset signal ERS is generated. The envelope signal EB is updated when a predetermined time interval (corresponding to the pulse width of the one-shot pulse) has elapsed after the optical head 1 is stopped. The reset signal ERS of FIG. 12(e) is generated when the track servo is turned off (kicked back) as shown in FIG. 12(d). When the reset signal ERS is generated at the timing described above, the updated envelope signal EB can be obtained corrsponding to a position of the optical head 1 after movement.

Among the track error detecting methods the following are the widly used:

(1) a 3-beam method,
(2) a push-pull method, and
(3) a heterodyne method.

The relative inclination detector 7 shown in FIG. 11 is applicable to any of the methods mentioned above. The arrangement of the relative inclination detector is not limited to the circuit shown in FIG. 11 and any conventional envelope detector may be used in place thereof.

Figure 13:
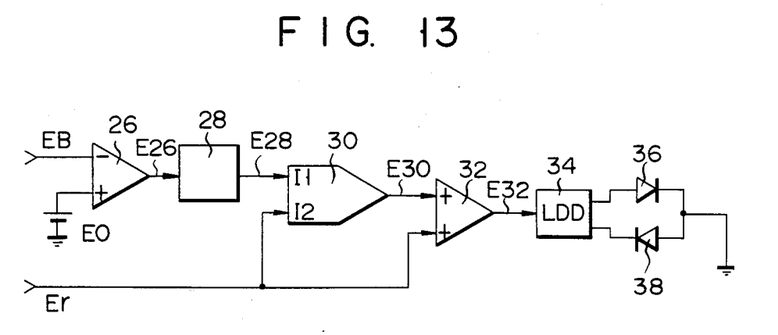
FIG. 13 is a circuit diagram of a beam correction circuit for correcting the light beam in accordance with the relative inclination.
Figure 14:
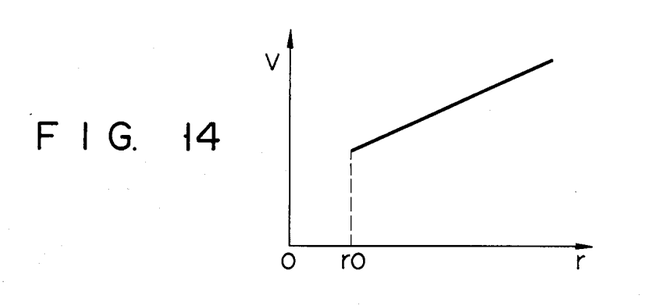
FIG. 14 is a graph showing a signal Er.

FIG. 13 shows an arrangement of the beam intensity correction circuit 9 of FIG. 10. Referring to FIG. 13, the envelope signal EB is supplied to the inverted input terminal of a differential amplifier 26. A constant voltage EO is applied to the noninverted input terminal of the differential amplifier 26. The voltage EO is preset in accordance with the reflectivity or the like of the optical disk. The voltage EO is equal to the voltage of the envelope signal EB when the relative inclination $\theta$ is zero. The output terminal of the differential amplifier 26 is connected to the input terminal of an absolute value circuit 28. The output terminal of the absolute value circuit 28 is connected to one input terminal I1 of multiplier 30. The output terminal of the multiplier 30 is connected to one input terminal of an adder/amplifier 32. A signal Er is supplied to the other input terminal of the adder/amplifier 32 and the other input terminal I2 of the multiplier 30. The signal Er corresponds to a distance r (the distance between the center of the optical disk 3 and the spot position of the light beam 5), as shown in FIG. 14. The signal Er can be readily obtained from a position detector (not shown) which detects the position of the optical head 1. The output terminal of the adder/amplifier 32 is connected to an LDD (laser diode driver) 34. The LDD 34 is connected to an LD (laser diode) 36 and a PIN diode 38.

The operation of the circuit of FIG. 13 will be described. The differential amplifier 26 calculates the difference between the voltage of the envelope signal EB and the voltage EO, and generates a signal E26. The absolute value circuit 28 calculates the absolute value of the signal E26 so as to, for example, match the correction amount at point A of FIG. 8 with that at point C thereof. The absolute value circuit 28 generates a signal E28 corresponding to the absolute value of the signal E26. The multiplier 30 multiplies the signal E28 with the signal Er. The product is amplified properly as needed. The multiplier 30 generates a signal E30. The reason why the signal E28 is multiplied with the signal Er lies in the fact that the intensity of the light beam 5 and hence the value to be corrected change in accordance with the distance r from the center, as shown in FIG. 2. Therefore, correction for optimal tracking can be performed. The adder/amplifier 32 adds the signal E30 to the signal Er and amplifies the resultant product with a proper gain. The adder/amplifier 32 generates a signal E32. The signal E30 corresponds to the correction amount of the light beam 5, while the signal Er corresponds to the original intensity of the light beam 5 at a point at the distance r from the center. The LDD 34 drives the LD 36 such that the emission quantity of the LD 36 becomes the value represented by the signal E32. The LDD 34 thus corrects the emission quantity of the LD 36 in accordance with the relative inclination $\theta$. In this case, the PIN diode 38 detects the intensity of the emission of the LD 36 and supplies a signal corresponding to the intensity to the LDD 34. The LDD 34 controls the emission quantity of the LD 36 in accordance with the fed-back signal. In other words, APC (automatic power control) is performed. According to the circuit of FIG. 13, the intensity of the light beam 5 is corrected in accordance with the relative inclination $\theta$. Therefore, even if the relative inclination $\theta$ is present, the proper pit length L can be guaranteed, and the jitter J can be decreased. Therefore, the error rate of the reproduced signal can be greatly decreased when the recorded information is reproduced.

Figure 15A:
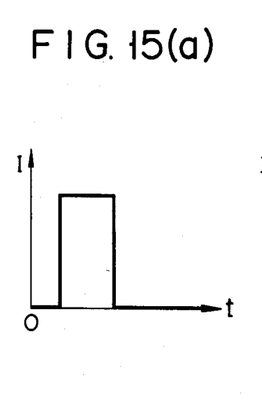
FIGS. 15(a) to 15(c) are respectively graphs for explaining the relationship between the relative inclination and light beam emission time.
Figure 15B:
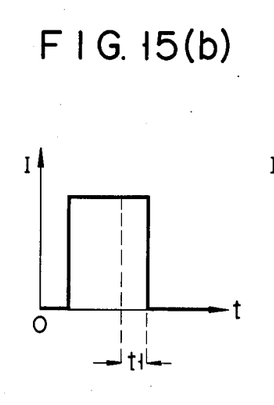
Figure 15C:
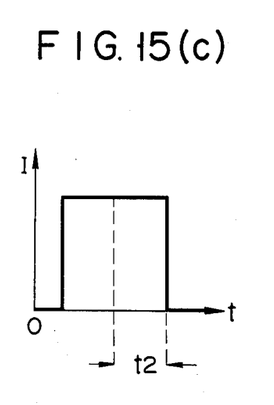

In the above embodiment, the intensity of the light beam 5 is corrected in accordance with the relative inclination $\theta$. However, the emission time of the light beam 5 may be corrected instead in accordance with the relative inclination $\theta$. FIGS. 15(a) to 15(c) respectively show the relationship between the intensity of the light beam and the emission time. FIG. 15(a) shows the case when the relative inclination $\theta$ is zero; FIG. 15(b) shows the case when the relative inclination $\theta$ is small; and FIG. 15(c) shows the case when the relative inclination $\theta$ is large. When the relative inclination $\theta$ is small, the emission time is prolonged by a time interval t1, as shown in FIG. 15(b). When the relative inclination $\theta$ is large, the emission time is prolonged by a time interval t2 (t2 < t1), as shown in FIG. 15(c). It should be noted that the intensity of the light beam 5 is the same in these cases. In this manner, the emission time of the light beam 5 is corrected to form pits respectively having the proper length LO.

Figure 16:
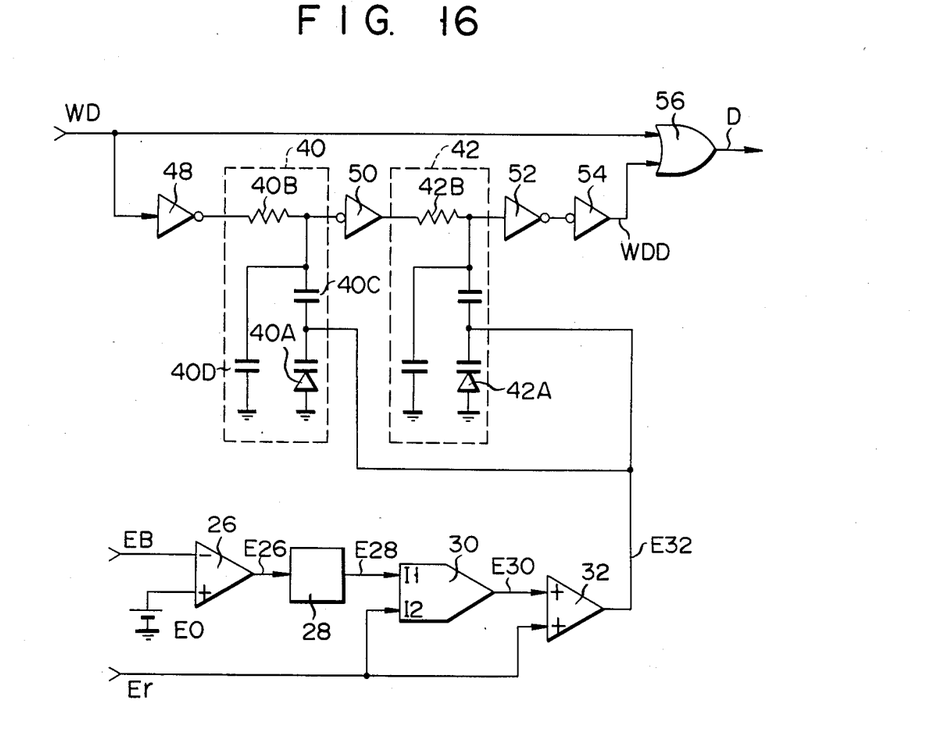
FIG. 16 is a beam emission time correction circuit for correcting the emission time of the light beam in accordance with the relative inclination.

FIG. 16 shows an arrangement of a beam emission time correction circuit. In this circuit, write data WD is written in the optical disk 3 when the light beam is set at H level. Referring to FIG. 16, the write data WD is supplied to an inverter 48. The output terminal of the inverter 48 is connected to a delay circuit 40. The output terminal of the delay circuit 40 is connected to the input terminal of an inverter 50. The output terminal of the inverter 50 is connected to a delay circuit 42. The output terminal of the delay circuit 42 is connected to the input terminal of an inverter 52. The output terminal of the inverter 52 is connected to the input terminal of an inverter 54. The output terminal of the inverter 54 is connected to one input terminal of an OR gate 56. The write data WD is also supplied to the other input terminal of the OR gate 56. The delay circuit 40 has the following arrangement. The anode of a varicap (variable capacitance diode) 40A is grounded. The cathode of the varicap 40A is connected to one end of a capacitor 40C. The other end of the capacitor 40C is connected to the input terminal of the inverter 50 and one end of a resistor 40B. The other end of the resistor 40B is connected to the output terminal of the inverter 48. The other end of the capacitor 40C is grounded through a capacitor 40D. The delay circuit 42 comprises a varicap 42A, a resistor 42B and two capacitors and has the same arrangement as the delay circuit 40, and a detailed description thereof will be omitted. A differential amplifier 26, an absolute value circuit 28, a multiplier 30 and an adder/amplifier 32 have the same arrangement and connection as those in the circuit of FIG. 13. The output terminal of the adder/amplifier 32 is connected to the cathode of the varicap 40A in the delay circuit 40. Similarly, the output terminal of the adder/amplifier 32 is connected to the cathode of the varicap 42A in the delay circuit 42.

Figure 17:
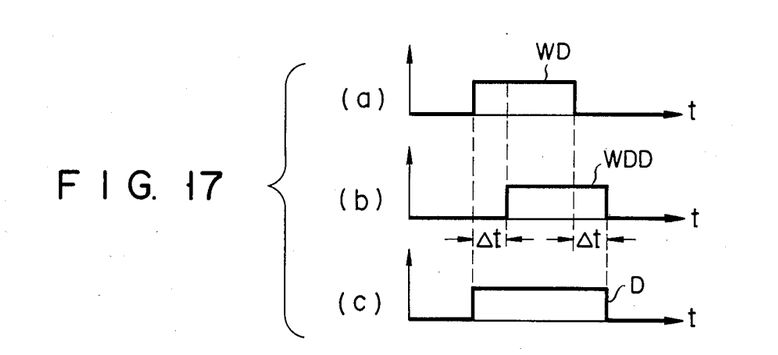
FIGS. 17(a) to 17(c) are timing charts of signals generated in the correction circuit of FIG. 16.

The operation of the circuit shown in FIG. 16 will be described with reference to FIGS. 17(a) to 17(c). The write data WD for the optical disk 3, as shown in FIG. 17(a) is supplied to the other input terminal of the OR gate 56. The write data WD is also supplied to the delay circuit 40 through the inverter 48. The output signal from the delay circuit 40 is supplied to the delay circuit 42 through the inverter 50. The output signal from the delay circuit 42 appears as data WDD through the inverters 52 and 54. The data WDD is supplied to one input terminal of the OR gate 56. The data WDD is delayed by Δt from the write data WD, as shown in FIG. 17(b). The data WD and the data WDD are logical OR-ed by the OR gate 56, and the resultant output serves as data D. The data D has a high level duration longer by Δt than that of the data WD. The LDD 34 shown in FIG. 13 drives the LD 36 in accordance with the data D, thereby correcting the emission time of the LD 36. As has been described above, the voltages applied to the varicaps 40A and 42A (i.e., voltage of the signal E32) change in accordance with the relative inclination θ, thereby controlling the delay time Δt and hence correcting the emission time of the light beam 5.

According to the arrangement described above, even if the relative inclination θ is present, proper pits are formed, and the jitter J decreases. In addition to these advantages, the error rate of the reproduced signal can be decreased.

In the above embodiment, the capacitances of the varicaps 40A and 42A change the delay times of the delay circuits 40 and 42. However, the present invention is not limited to the above arrangement. For example, FETs may be connected in place of the resistors 40B and 42B. In this case, the resistances of the FETs are controlled. In the circuit shown in FIG. 16, two delay circuits 40, 42 are arranged. However, the number of delay circuits is not limited to two, but may be arbitrarily set. In the circuits shown in FIGS. 13 and 16, and adder/amplifier 32 may have 3-input terminals. In this case, the signal E30 from the multiplier 30 is supplied to the first input terminal; a signal component of the signal Er which changes as a function of the distance r is supplied to the second input terminal; and a DC component of the signal Er is supplied to the third input terminal.

In the above embodiment, the intensity or emission time of a light beam is compensated in accordance with a relative inclination θ. However, the present invention is not limited to this. For example, the intensity and the emission time of the light beam may be simultaneously corrected. Alternatively, the intensity of the light beam may be increased and the emission time may be shortened so as to form pits of the proper length. In this case, changes in the emission time of the LD 36 can be large.

What is claimed is:

1. An optical disk apparatus, comprising:
   an optical head for radiating a light beam onto a recording medium and for forming pits in said recording medium so as to record a signal;
   detecting means for detecting a relative inclination between the light beam radiated from said optical head and a given direction relative to the radiated surface portion of said recording medium, and for generating a signal corresponding to an angle of the relative inclination; and
   correcting means coupled to said detecting means for receiving the signal corresponding to the angle of the relative inclination from said detecting means, and for increasing the energy of the light beam in proportion to the relative inclination to form pits of a predetermined length in said recording medium.

2. An apparatus according to claim 1, wherein said correcting means comprises means for increasing the intensity of the light beam emitted from said optical head as said relative inclination increases.

3. An apparatus according to claim 1, wherein said correcting means comprises means for lengthening the emission time of the light beam from said optical head as said relative inclination increases.

4. An apparatus according to claim 1, including track error signal generating means for generating a track error signal to control tracking of said optical head, and said detecting means detects the relative inclination in accordance with the track error signal.

5. An apparatus according to claim 4, wherein said detecting means detects the relative inclination in accordance with an envelope signal of the track error signal.

6. An apparatus according to claim 5, wherein said detecting means comprises means for receiving the track error signal and generating a signal representing the envelope of the track error signal, and means for comparing the envelope signal with a certain reference signal to find the relative inclination.

7. An apparatus according to claim 6, wherein said comparing means comprises means for receiving the track error signal and holding the maximum level of the track error signal, and means for resetting the level of the signal held by said signal receiving and holding means.

8. An apparatus according to claim 7, wherein said resetting means resets the level of the held signal when the distance between the center of said recording medium and a spot radiated by the light beam on said recording medium changes.

9. An apparatus according to claim 8, wherein said resetting means resets the level of the held signal upon lapse of a predetermined time period after said optical head has been moved.

10. An apparatus according to claim 1, including a recording medium in the form of a disk.

11. An apparatus according to claim 10, comprising second correction means for receiving a location signal representing the distance between the center of said disk recording medium and the spot radiated by the light beam on said recording medium, and for increasing the energy of the light beam as the value of the location signal increases.

12. An apparatus according to claim 11, wherein said second correction means includes means for increasing the intensity of the light beam as the relative inclination increases.

13. An apparatus according to claim 11, wherein said second correcting means includes means for lengthening the time during which said optical head emits the light beam, as said distance increases.

* * * * *